(12) United States Patent
Skalet et al.

(10) Patent No.: US 9,530,140 B2
(45) Date of Patent: Dec. 27, 2016

(54) AFFILIATE INVESTIGATION SYSTEM AND METHOD

(71) Applicant: BrandVerity Inc., Seattle, WA (US)

(72) Inventors: Andrew Skalet, Seattle, WA (US);
Hyung-Joon Kim, Kirkland, WA (US);
David Naffziger, Seattle, WA (US)

(73) Assignee: BRANDVERITY, INC., Seattle, WA (US)

(*) Notice: Subject to any disclaimer, the term of this patent is extended or adjusted under 35 U.S.C. 154(b) by 446 days.

(21) Appl. No.: 14/073,549

(22) Filed: Nov. 6, 2013

(65) Prior Publication Data

US 2014/0067700 A1    Mar. 6, 2014

Related U.S. Application Data

(62) Division of application No. 13/190,338, filed on Jul. 25, 2011, now Pat. No. 8,892,459.

(51) Int. Cl.
| | |
|---|---|
| G06F 15/16 | (2006.01) |
| G06Q 30/00 | (2012.01) |
| H04L 29/08 | (2006.01) |
| G06F 12/00 | (2006.01) |

(52) U.S. Cl.
CPC ............ *G06Q 30/018* (2013.01); *G06Q 30/00* (2013.01); *H04L 29/08072* (2013.01)

(58) Field of Classification Search
USPC .............. 709/203, 223–229, 250; 705/14, 16
See application file for complete search history.

(56) References Cited

U.S. PATENT DOCUMENTS

| | | | | |
|---|---|---|---|---|
| 8,892,459 B2* | 11/2014 | Skalet | .................. | G06Q 30/018 |
| | | | | 705/14.58 |
| 8,954,588 B1* | 2/2015 | Bertz | ...................... | H04L 67/28 |
| | | | | 709/226 |
| 9,015,068 B1* | 4/2015 | Bertz | ................. | G06Q 30/0633 |
| | | | | 705/26.8 |
| 9,215,180 B1* | 12/2015 | Bertz | ...................... | H04L 47/25 |

OTHER PUBLICATIONS

"New Affiliate Report: Discover the Size and Strength of Competitors' Affiliate Programs," 9 pages, Jan. 22, 2009, US, published by SearchMonitor.†
David Naffziger, "How We Identify Affiliate Ads," 6 pages, Sep. 29, 2008, US, published by BrandVerity.†
"BrandVerity Launches PoachMark to Protect Trademarks in Search Ads," 2 pages, Jun. 10, 2009, US, published by BrandVerity.†

\* cited by examiner
† cited by third party

*Primary Examiner* — Zarni Maung
(74) *Attorney, Agent, or Firm* — AEON Law; Adam L. K. Philipp

(57) ABSTRACT

Given an advertisement placed by a rogue affiliate that takes steps to hide its affiliate ID from affiliate investigators, the affiliate ID may be identified using a step-wise link follower to process the advertisement's target URIs. For each redirection step inclusively between the original target URI and the ultimate destination URI, the current URI is analyzed and requested according to either a trusted request method or a non-trusted request method depending on whether the resource to which the URI refers is known to be a trusted resource. The non-trusted request method is designed to thwart the rogue affiliate's efforts to identify an affiliate investigator as the source of the request.

9 Claims, 11 Drawing Sheets ions that affiliates are allowed to use. For example, it is common for merchant affiliate programs to forbid affiliates from bidding on search terms that are closely related to the merchant's brand. For example, the Zappos Affiliate Program forbids affiliates from bidding on brand-name search terms such as "Zappos", "Zappos Shoes", "Zappos.com", or variants thereof (e.g., "Zapppos", "zapos", and the like). Similarly, the Amazon affiliate program forbids affiliates from bidding on brand-name search terms (or variants thereof) such as "Amazon", "Kindle", and the like.

For example, FIG. 1 illustrates an exemplary search ad 105 displayed in a web browser window 100, as is known in the art. As shown in the example, a user has searched for the term "Zappos", and in addition to providing a number of "organic" search results 125A-B for that term, the search engine has also presented an ad 105, typically because an advertiser (possibly an affiliate of the merchant Zappos) has bid on the search term "Zappos". Ad 105 has several components, including a display Uniform Resource Identifier ("URI") 115 and a clickable link 110, which includes an anchor (here, the text, "Zappos.com—Free Shipping Both Ways at Zappos" is the anchor, but an image could also be an anchor) as well as a target URI (a portion of which is previewed in status bar 120). Many online advertisements include similar components.

If an affiliate who participates in Zappos.com's affiliate program bid on the search term "Zappos" in order to have ad 105 presented to users who search for that term, then that affiliate would be in violation of Zappos.com's terms of service for its affiliate program. If an investigator identified the rogue affiliate to Zappos.com, the rogue affiliate would be subject to expulsion from the program and/or withholding of unpaid revenue shares. However, many rogue affiliates go to great lengths to hide their affiliate IDs from discovery, including employing monitoring-detection techniques and exhibiting deceptive behavior when monitoring is detected or suspected. Consequently, existing solutions are frequently unable to trace a given ad back to a particular affiliate. Moreover, once a particular affiliate has been identified, many ad networks do not provide a mechanism for determining whether a given affiliate participates in a given merchant's affiliate program.

AFFILIATE INVESTIGATION SYSTEM AND METHOD

CROSS REFERENCE TO RELATED APPLICATIONS

This application is a division of copending U.S. application Ser. No. 13/190,338, filed on Jul. 25, 2011, titled "AFFILILATE INVESTIGATION SYSTEM AND METHOD", and naming inventors Andrew SKALET, Hyung-Joon KIM and David NAFFZIGER. The above-cited application is incorporated herein by reference in it entirety, for all purposes.

FIELD

The present disclosure relates to online marketing, and more particularly to investigating e-commerce advertisements placed by members of a merchant's affiliate program.

BACKGROUND

Affiliate marketing is a marketing practice in which a business rewards one or more affiliates for visitors or customers brought about by the affiliate's own marketing efforts. In the context of online marketing and e-commerce merchants, affiliate marketing can be viewed as a method of using one website (maintained by an affiliate) to drive traffic to another website (typically an e-commerce merchant's website).

The e-commerce merchant is typically a brand-name retailer of goods and/or services, such as Amazon.com (provided by Amazon.com, Inc. of Seattle, Wash.), Newegg.com (provided by Newegg Inc. of City of Industry, California), Zappos.com (provided by Amazon.com, Inc. of Seattle, Wash.), and the like, that offers a merchant affiliate program. E-commerce merchants may also include lead-based businesses, such as insurance companies, credit card companies, mortgage and/or financial product companies, online university programs, "daily deals" services, and other like business that offer merchant affiliate programs.

An affiliate that participates in a merchant affiliate program may seek to direct traffic to the e-commerce merchant's website using advertising methods such as organic search engine optimization, paid search engine marketing, e-mail marketing, display advertising, and the like. Other affiliates may seek to direct traffic to the e-commerce merchant's website by publishing content (e.g., news, reviews, and the like) related to the goods and/or services offered by the e-commerce merchant.

Many merchant affiliate programs place restrict

DESCRIPTION

Figure 1:
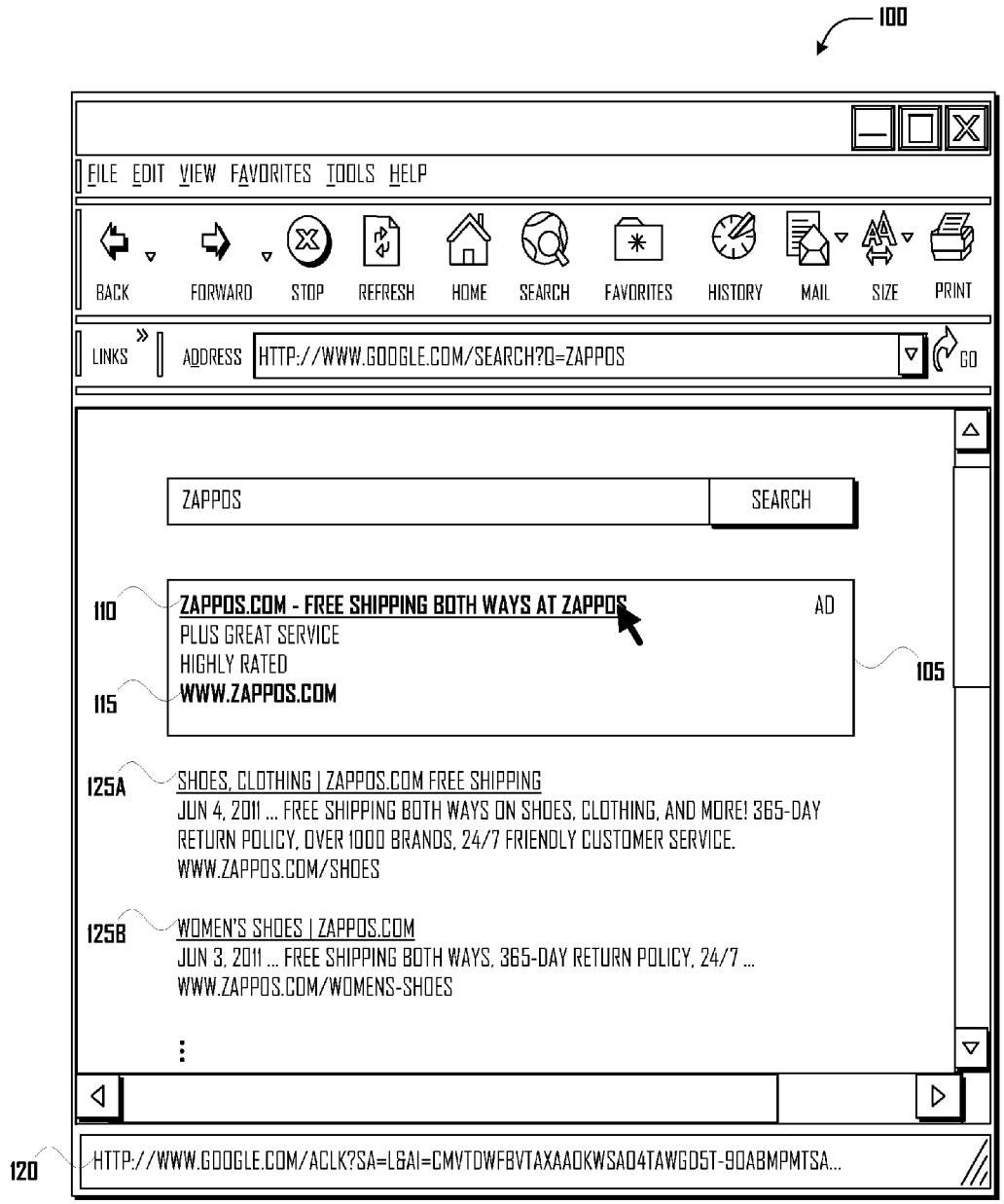
FIG. 1 illustrates an exemplary search ad displayed in a web browser window, as is known in the art.

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Figure 2:
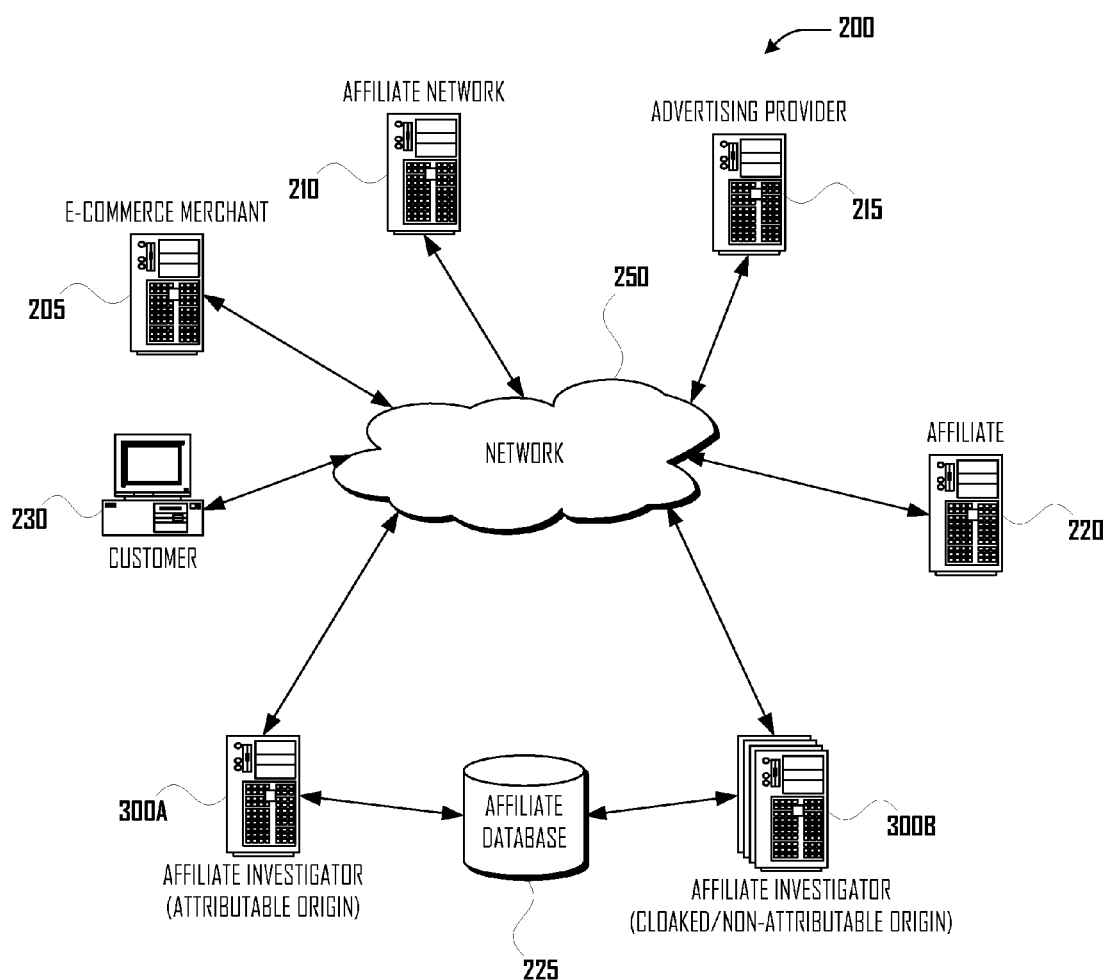
FIG. 2 is a network diagram in accordance with one embodiment.

Online affiliate marketing typically involves several different entities that operate and/or are responsible for a number of interconnected devices, including e-commerce merchant 205, an affiliate network 210, an affiliate 220, an advertising provider 215, and a customer 230, as illustrated in FIG. 2 in accordance with one embodiment. Devices operated by these entities are connected to network 250 along with affiliate investigator computers 300A-B, which are operated by an affiliate investigator, as discussed further below. Affiliate investigator devices 300A-B are also connected to an affiliate database 225.

In some embodiments, e-commerce merchant 205 may include brand-name merchants such as Amazon.com, Newegg.com, Zappos.com, and the like. In various embodiments, affiliate network 210 enables the e-commerce merchant 205 to offer an affiliate program by which affiliate 220 may earn a share of the revenue that is generated by the e-commerce merchant 205 from customer 230 when affiliate 220 refers customer 230 to e-commerce merchant 205. In some cases, affiliate 220 may instead or in addition earn a fee when customer 230 completes a specific action (e.g., makes a purchase, registers for a newsletter, and the like).

Some e-commerce merchants, notably Amazon.com, operate their own merchant affiliate programs and can thus be considered to be both e-commerce merchants and affiliate networks. However, most e-commerce merchants choose to have a third party operate their merchant affiliate programs. For example, many merchant affiliate programs are provided by third parties such as Commission Junction (provided by ValueClick, Inc. of Westlake Village, Calif.), LinkShare (provided by LinkShare Corporation of New York, N.Y.), and the like.

Third party affiliate networks act as an intermediary between affiliates and merchant affiliate programs. Third party affiliate networks typically allow prospective affiliates to find and participate in suitable merchant affiliate programs. For merchants, affiliate networks may provide tracking technology, reporting tools, payment processing, and access to a large base of affiliates. For affiliates, affiliate networks may simplify the process of registering for one or more merchant affiliate programs, provide reporting tools, and aggregate payments.

In various embodiments, network 250 comprises communication switching, routing, and/or data storage capabilities. In various embodiments, network 250 may comprise some or all of the Internet, one or more intranets, and wired and/or wireless network portions. In various embodiments, there may be more than of some or all of the devices, databases, and networks illustrated in FIG. 2. However, FIG. 2 illustrates a sufficiently representative collection of devices to describe the embodiments discussed below. Moreover, while FIG. 2 shows various devices and databases as singular devices, in alternative embodiments, the functions, processes, and routines performed by some or all of e-commerce merchant 205, affiliate network 210, affiliate 220, advertising provider 215, investigator devices 300A-B, and/or affiliate database 225 could be hosted or distributed among two or more different devices and/or may use multiple devices to comprise one logical device—for example, when such devices and/or databases are executed or hosted in a "cloud computing" environment.

Alternatively, in some embodiments, two or more of investigator devices 300A-B and/or affiliate database 225 may be hosted on a single physical computing device. For example, in some embodiments, affiliate database 225 may be a process executing on one or both of affiliate investigator devices 300A-B.

In various embodiments, affiliate investigator computers 300A-B may be any device that is capable of communicating with other devices on network 250 and affiliate database 225, including desktop computers, laptop computers, mobile phones and other mobile devices, PDAs, set-top boxes, and the like.

In various embodiments, affiliate database 225 may include a set of records representing, e.g., advertisements that have been identified online, affiliate identifiers that have been previously identified, as well as associations between advertisements and affiliate identifiers.

Figure 3:
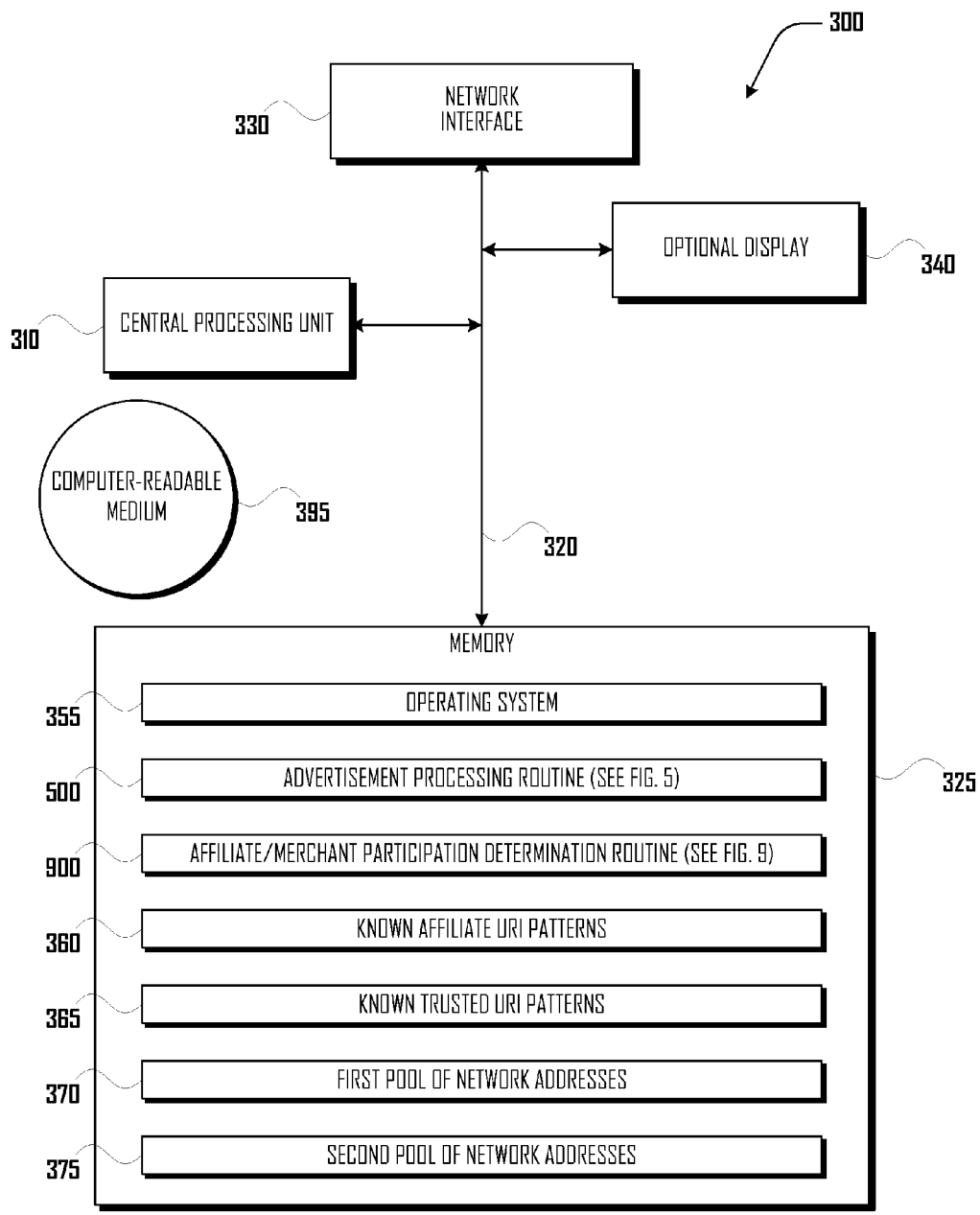
FIG. 3 illustrates one embodiment of an affiliate investigator computer.

FIG. 3 illustrates an exemplary affiliate investigator computer 300. In various embodiments, affiliate investigator computer 300 may be operated by or at the behest of an e-commerce merchant to, for example, monitor participants in the merchant's affiliate program to ensure that participating affiliates abide by advertising restrictions and other terms of service, or for other purposes. In other embodiments, affiliate investigator computer 300 may be operated by a third-party monitoring service, such as BrandVerity, Inc. of Seattle, Wash. (the assignee of the present application).

The example system of FIG. 3 depicts a number of subsystems, modules, routines, and engines, some or all of which may by employed in a particular embodiment; the systems, modules, routines, and engines are not, however, limited to those illustrated. Other embodiments could be practiced in any number of logical software and physical hardware components and modules. The modules and components are listed herein merely for example.

Affiliate investigator computer 300 includes a processing unit 310, a memory 325, and an optional display 340, all interconnected, along with network interface 330, via bus 320. Memory 350 generally comprises a random access memory ("RAM"), a read only memory ("ROM"), and/or a permanent mass storage device, such as a disk drive. In some embodiments, memory 350 may also comprise a local and/or remote database, database server, and/or database service (e.g., affiliate database 225). In other embodiments, network interface 330 and/or other database interface (not shown) may be used to communicate with a database (e.g., affiliate database 225). Memory 325 stores program code and/or data for some or all of an advertisement processing routine 500 (see FIG. 5, discussed below) and an affiliate/merchant participation determination routine (see FIG. 12, discussed below).

In addition, memory 350 also stores an operating system 355, a list of patterns 360 that affiliate URIs from known affiliate networks conform to (see Table 1, discussed below), and a list of known trusted URI patterns 365 (see Table 3, discussed below). In some embodiments, known-affiliate URI patterns 360 may reside in affiliate database 225.

These and other software components may be loaded from a computer readable storage medium 395 into memory 350 of affiliate investigator computer 300 using a drive mechanism (not shown) associated with a non-transient, computer readable storage medium 395, such as a floppy disc, tape, DVD/CD-ROM drive, memory card, onto which instructions may be tangibly (including magnetically) embodied. In some embodiments, software components may also be loaded via the network interface 330 or other non-storage media.

Figure 4:
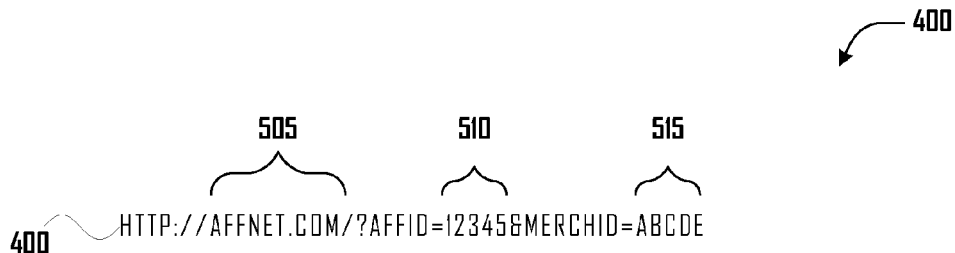
FIG. 4 illustrates an exemplary tracking URI, in accordance with one embodiment.

FIG. 4 shows an exemplary simplified tracking URI 400 in accordance with one embodiment. For a merchant affiliate program to work properly, the merchant must be able to trace a given visitor or customer back to a particular affiliate who referred the customer to the merchant. Affiliate referrals are frequently tracked via a specially formed "tracking URI", such as the exemplary simplified tracking URI 400.

As is typical of tracking URIs in general, simplified tracking URI 400 includes an affiliate identifier 410 and a merchant identifier 415. Tracking URI 400 also includes a domain identifier 405 referring to a server operated by a particular affiliate network. Most affiliate networks have a small number of standardized URI structures that their tracking URIs conform to. This structure varies by affiliate network, but is usually consistent within an affiliate network. In many embodiments, a tracking URI may include additional identifiers (not shown), such as a campaign identifier, a creative identifier, a special offer identifier, and the like.

In various embodiments, an affiliate investigator may determine and store pattern definitions (e.g., known-affiliate URI patterns 360) that can be used to identify affiliate-tracking URIs from various affiliate networks and to extract affiliate IDs from tracking URIs thus identified. For example, Table 1 (below) includes several representative pattern definitions for domains associated with several representative affiliate networks. Using the pattern definitions shown in Table 1, a given URI is considered to be an affiliate tracking URI when 1) the given URI's domain portion matches one of the domains listed in the first column for a given row, and 2) the given URI also matches a regular expression listed in the second column for that row.

TABLE 1

| Domains | Regular Expression(s) |
|---|---|
| tkqlhce.com<br>dpbolvw.net | /(?:click\|email\|image )-(?:%20)*([0-9]{3,})- |
| kqzyfj.com<br>qksrv.net<br>anrdoezrs.net<br>kqzyfj.com<br>jdoqocy.com<br>commission-junction.com<br>tqlkg.com<br>ftjcfx.com<br>afcyhf.com<br>lduhtrp.net<br>emjcd.com<br>apmebf.com | /interactive.+pid=([0-9]{3,8}) |
| pgpartner.com<br>pgpartner.co.uk<br>pgpartner.ca | ^http (?:\|s)://([\\w-]*?)\\.pgpartner\\.(?:com\|co\\.uk\|ca)/ |
| linksynergy.com | click\\.linksynergy\\.com/(?:fs-bin/click\|fs-bin/stat\|deeplink).*[&\\?]id=([\\w,/*]{11,11}) |
| clickbank.net | ^https?://([a-z,0-9]+)\\.[a-z,0-9]+\\.hop\\.clickbank\\.net(?:/\|$\|\\?) |
| pjatr.com<br>pjtra.com<br>pntrs.com<br>gopjn.com<br>pntrac.com<br>pepperjamnetwork.com<br>pntra.com | (?:pjatr\|pjtra\|pntrs\|pntra\|pntrac\|gopjn\|pepperjamnetwork)\\.com/t/\\d+-\\d+-(\\d+)-\\d |
| perfiliate.com | perfiliate\\.com/brains/.*?\\.php.*?[?&]PURL=.+?\\.at/(\\w+) |
| amazon.com<br>amazon.co.uk<br>amazon.ca<br>amazon.cn<br>amazon.fr<br>amazon.de<br>amazon.it<br>amazon.co.jp<br>endless.com<br>javari.fr<br>javari.co.uk<br>javari.jp | (?:amazon\|endless\|javari)\\.(?:\\w{2,3}\|co\\.\\w{2})/.*[\\?&]tag=([-\\w]+) |

The regular expressions listed in the second column of Table 1 follow the regular expression syntax of the Python programming language, as is well known in the art. (See, e.g., Python Regular expression documentation, such as that found at http://docs.python.org/library/re.html, which is incorporated by reference.) Thus, those of ordinary skill in the art will recognize that each of the regular expressions listed in the second column of Table 1 includes one capturing group "( . . . )" and zero or more non-capturing groups "(?: . . . )". The regular expression inside the capturing group parentheses matches the affiliate ID portion of the URI being evaluated.

Thus, using the patterns shown in the first row of Table 1, the URI "http://www.tkqlhce.com/click-2883927-10517864?sid=2277162" could be identified as an affiliate tracking URI with an affiliate ID of "2883927".

The Python-syntax regular expressions listed in Table 1 are merely illustrative of one pattern-matching technique that may be employed in some embodiments. In other embodiments, tracking URI patterns may be matched according to different regular expression syntaxes or according to non-regular-expression pattern matching methods, including globbing, wildcard matching, and the like. In some embodiments, some or all affiliate links may be encrypted and may need to be decrypted prior to determining the affiliate ID.

As discussed above, an affiliate tracking URI refers to an affiliate-tracking resource that is associated with an affiliate and a merchant (as indicated by their respective IDs, e.g., 410 and 415). When a customer's web browser sends a request for the affiliate-tracking resource, the responding server typically sends a response that includes 1) a directive to set an affiliate tracking cookie and 2) a redirect URI, which refers to a redirect resource. In many cases, the redirect resource is a product page or other landing page at an e-commerce merchant. Typically, the affiliate tracking cookie includes the affiliate identifier, and the cookie is set to expire after a period of several hours or days. If the customer makes a purchase from the e-commerce merchant during the lifetime of the affiliate tracking cookie, then the affiliate associated with the affiliate ID typically earns a portion of the revenue thus generated and/or a predetermined fee.

For a variety of reasons, affiliate-placed advertisements (e.g., ad 105, see FIG. 1, discussed above) typically do not link directly to an affiliate-tracking resource. Rather, affiliate-placed advertisements typically link to an intermediate target resource. For example, that target URI of ad 105 (a portion of which is previewed in status bar 120) refers to a resource provided by an advertising network. When a customer's web browser requests ad 105's target URI, there may be several intermediate redirect steps before the customer's web browser is redirected to an affiliate tracking URI. Such intermediate redirection steps may include redirections to advertising networks, advertising analytics providers, affiliate brokers, and various other legitimate link and/or advertising tracking services. For example, Table 2 shows a greatly simplified set of redirect communications that result from following a target URI of an affiliate-placed advertisement.

TABLE 2

| | |
|---|---|
| Request | GET /products/buy/click-through/299042 HTTP/1.1 |
| | Host: http://www.dpr.com |
| Response headers | HTTP/1.1 302 Found |
| | Location: http://dpr.pgprtnr.com/rd.php?. . . |
| | Set-Cookie: qeoloc=US; domain=.dpr.com; expires=09-Jun-2012 |
| Redirect 1 request | GET / rd.php?. . . HTTP/1.1 |
| | Host: http:// dpr.pgprtnr.com |
| Redirect 1 response headers | HTTP/1.1 301 Moved Permanently |
| | Set-Cookie: paid_display=1; expires=09-Jun-2011 |
| | Location: http://www.pg.com/ut_sync.php?ut=416590e95e. . . |
| Redirect 2 request | GET /ut_sync.php?ut=416590e95e. . . HTTP/1.1 |
| | Host: http://www.pg.com |
| redirect 2 response headers | HTTP/1.1 302 Found |
| | Set-Cookie: traffic=Direct; |
| | Set-Cookie: cookie=...; expires=08-Jun-2012; domain=.pg.com |
| | Set-Cookie: timestamp=...; expires=08-Jun-2012; domain=.pg.com |
| | Set-Cookie: paid_display=1; expires=09-Jun-2011; |
| | Set-Cookie: ut_sync=...; expires=10-Jun-2011; domain=.pgprtnr.com |
| | Set-Cookie: viewed=...; expires=09-Jul-2011; domain=.pgprtnr.com |
| | Location: http://www.bdg.com/shop/cart.aspx?sku=NKCPP300. . . |
| Redirect 3 request | GET //shop/cart.aspx?sku=NKCPP300. . . HTTP/1.1 |
| | Host: http://www.bdg.com |
| Redirect 3 response headers | HTTP/1.0 200 OK |
| | Set-Cookie: Bag=86375004; path=/ |
| | Set-Cookie: Cart=NKCPP300,1; expires=10-Jun-2011; path=/ |

In the simplified communications represented by Table 2, the redirect URI provided in response to the initial request ("http://dpr.pgprtnr.com/rd.php? . . . ") is an affiliate tracking URI, and the value "dpr" is an affiliate ID that identifies the affiliate that placed the advertisement being followed.

However, a "rogue" affiliate may try to hide its affiliate ID from the e-commerce merchant and/or affiliate investigators. Rogue affiliates may utilize any number of techniques to hide their affiliate IDs. For example, a sophisticated rogue affiliate may use disposable URLs and "front" websites as part of its affiliate ID hiding techniques. An ad placed by such a sophisticated rogue affiliate may target a "disposable" URI that cannot easily be associated with the rogue affiliate and that can be discarded after a period of time. Common sources of "disposable" URIs include commercial URL shortening services, raw IP addresses, or (most commonly) recently registered domains with faked domain registry information or a "private registration", such that the affiliate cannot be identified via whois queries and/or domain registry data.

When a visitor requests the disposable URI, the rogue affiliate conducts a number of checks on the visitor to determine whether the rogue affiliate's affiliate link should be presented to the visitor. If the rogue affiliate does not present their link to the visitor, the rogue affiliate cannot earn any affiliate commission and/or fees. However, if the rogue affiliate presents its affiliate link to an affiliate investigator, then the rogue affiliate's identity may be discovered, which may lead to the rogue affiliate's being terminated from the merchant's affiliate program. Rogue affiliates may conducting a range of checks including checking the HTTP referrer header, checking whether the visitor's network address is known to be associated with an e-commerce merchant or other known affiliate investigating service (e.g., according to registry information maintained by an Internet registry, such as American Registry for Internet Numbers, Réseaux IP Européens Network Coordination Centre, and the like), checking whether the visitor's browser's history includes pages associated with an e-commerce merchant or other known affiliate investigating service, and the like.

In some cases, a rogue affiliate may also use geolocation software to deduce the geographic location of the visitor. For example, the rogue affiliate may compare the visitor's IP address with a geolocation database to determine what country, city, and/or postal code the visitor's request appears to originate from. Similarly, a rogue affiliate may use domain registry information to identify an organization to which the visitor's IP address has been assigned. The visitor may fail these checks if the visitor's IP address has been assigned to a known affiliate investigating entity, if the visitor's deduced geolocation corresponds to the geolocation of a known affiliate investigating entity, and/or of the visitor's IP address is otherwise attributable to a known affiliate investigating entity.

If the visitor passes these checks, the visitor is redirected to a "front" website. The rogue affiliate's front website typically appears to be legitimate. The front website might be a blog, a review site, or (commonly) a coupon site. When the visitor arrives at the front website, more checks on the visitor are sometimes performed. If the visitor passes all of those checks, the visitor is auto-redirected to an affiliate link.

Thus, one of the front website's primary purposes is to "launder" the HTTP referrer, such that the visitor is redirected to the affiliate link with an HTTP referrer from the front website. Referrer laundering is a technique frequently used by rogue affiliates to mask the actual origin of a visitor being redirected to an affiliate tracking link, such as in the following scenario:

(1) a user searches for "SampleStore" on a search engine;
(2) the user clicks an affiliate-placed search ad for SampleStore.co;
(3) the user is directed (or redirected) to a page on AffilateSite.com; the page on AffiliateSite.com loads for a split second, before the user is automatically redirected on to SampleStore.com.

Thus, SampleStore's referrer logs and affiliate network stats show that the user came from a page on AffiliateSite.com. There is no indication that the user actually came from a search ad and many affiliate managers interpret this traffic as pure affiliate value add.

Consequently, from the perspective of the affiliate network and the merchant, the visitor appears to have been referred directly from the front website (an apparently legitimate source of visitor referrals), notwithstanding that the visitor may never have been exposed to the front website at all (as most web browsers do not expose intermediate redirects to the user).

"Reverse Geo-targeting" is another technique used by rogue affiliates to hide their affiliate IDs from merchants and other affiliate investigators. Using this technique, a rogue affiliate would run advertisements that are geographically targeted to exclude regions from which an e-commerce merchant and/or other affiliate investigator is expected to monitor from. For example, Amazon.com is located in Seattle, Wash. A rogue Amazon affiliate might target its ads to every city except Seattle, to every state except for Washington, and so on.

Thanks to these and similar techniques used by rogue affiliates to hide their affiliated IDs, e-commerce merchants and other affiliate investigators may, in some embodiments, use systems and methods as described below to discover affiliate IDs associated with rogue affiliates. In many embodiments, an affiliate investigator may operate one or more web robot software programs to run automated tasks over the Internet, the web robot or robots using different profiles to investigate affiliate-placed advertisements and identify affiliate IDs despite a rogue affiliate's deceptive hiding techniques.

Figure 5:
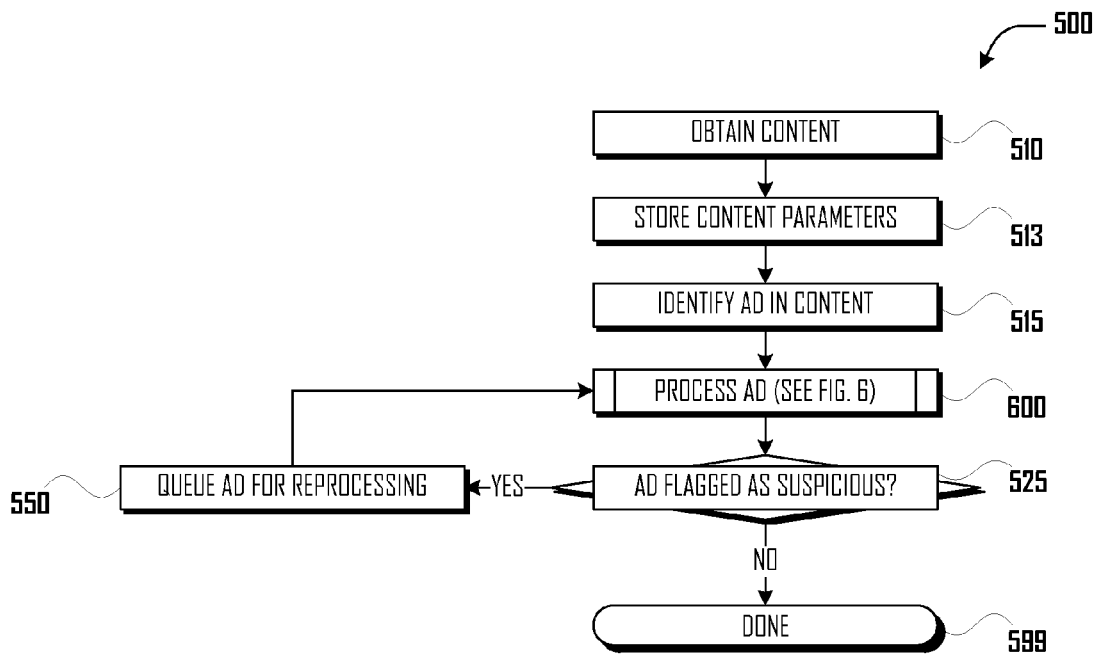
FIG. 5 illustrates an advertisement processing routine, in accordance with one embodiment.

For example, FIG. 5 illustrates an advertisement processing routine 500, such as may be performed by an affiliate investigator in accordance with one embodiment. In block 510, routine 500 obtains content from an advertising provider. For example, in one embodiment, obtaining such content may include sending a query to a search engine and receiving a search results page including one or more advertisements. In other embodiments, obtaining such content may include requesting a web page from a review site, a coupon site, a blog, a social networking web site, a social media platform, or other web site on which advertisements appear alongside other content. In still other embodiments, obtaining such content may include obtaining a tweet or other micro-blog entry, promotional email, text message or other advertisement-containing content that may not necessarily appear on a web page.

Some rogue affiliates may run search ads only outside ordinary hours of business in the time zone of a given e-commerce merchant or other affiliate investigator, on the theory that affiliate investigators working for the e-commerce merchant are less likely to be monitoring ads outside normal business hours. Accordingly, in some embodiments, obtaining the content may include performing a search at a search engine outside of normal business hours for the merchant. In some embodiments, routine 500 may be performed iteratively, at varying times of day.

Some rogue affiliates may run search ads only outside geographic locations associated with a given e-commerce merchant or other affiliate investigator, on the theory that affiliate investigators working for the e-commerce merchant are less likely to discover ads that do not appear when search terms are searched for from the merchant's location. Accordingly, in some embodiments, obtaining the content may include performing a geographically targeted search at a search engine. For example, to target ads directed towards Omaha, Nebr., some embodiments may add a geographic directive such as "&gc=us&gcs=omaha&gr=ne" to a Google search (provided by Google Inc. of Menlo Park, Calif.). Other search engines may respond to similar geographic directives. In some embodiments, routine 500 may be performed iteratively, targeting varying geographic locations.

In block 513, routine 500 stores in affiliate database 225 one or more parameters associated with the content and the obtaining thereof. For example, in one embodiment, routine 500 may store a URI corresponding to the content, a date and time at which the content was obtained, geographic targeting parameters associated with the content (if any, e.g., a search engine geographic target directive, as discussed above), and the like. In some embodiments, such parameters may be used when advertisements identified within the content (discussed below) are processed and/or reprocessed.

In block 515, routine 500 identifies in the content obtained in block 510 an advertisement for an e-commerce merchant website that may offer goods and/or services to website visitors. In many cases, the advertisement will comprise text that mentions or otherwise identifies the e-commerce merchant website. In some cases, advertisements may be indicated as such within the structure of the content (e.g., when the content is a search results page). In other cases, routine 500 may process the content to identify likely advertisements. For example, in one embodiment, routine 500 may identify all links included in the content and identify as possible advertisements those links that appear most frequently. In some embodiments, routine 500 may identify outbound links (links that target a different website than the content resides on) as possible advertisements. In some embodiments, routine 500 may identify links whose target URI matches a known affiliate-URI pattern (see, e.g., the illustrative patterns shown in Table 1, discussed above). In other embodiments, routine 500 may identify an advertisement in the content according to other suitable methods.

In subroutine block 600, routine 500 processes the identified advertisement (see FIG. 6, discussed below). In some embodiments, processing the identified advertisement may be timed to occur on a different day than the day on which the content was obtained in block 510, but at a similar time of day to the time of day at which the content was obtained.

In decision block 525, routine 500 determines whether, in the course of processing the advertisement, the advertisement was flagged as suspicious, meaning that the advertisement's target URI behaves in a way that may suggest that a rogue affiliate is employing deceptive techniques to hide its affiliate ID from an affiliate investigator. If so, then in block 550, routine 500 queues the advertisement for reprocessing. In some embodiments, queuing the advertisement for reprocessing may include scheduling the advertisement for reprocessing at a different time of day and/or from a different apparent geographic origin (as discussed below in regards to FIG. 7). If the advertisement is repeatedly queued for reprocessing, the iterative reprocessing processes may be times to occur at disparate times of day and/or using dispersed geographical points of origin. Otherwise, if the advertisement was not flagged as suspicious, routine 500 ends in block 599.

Figure 6:
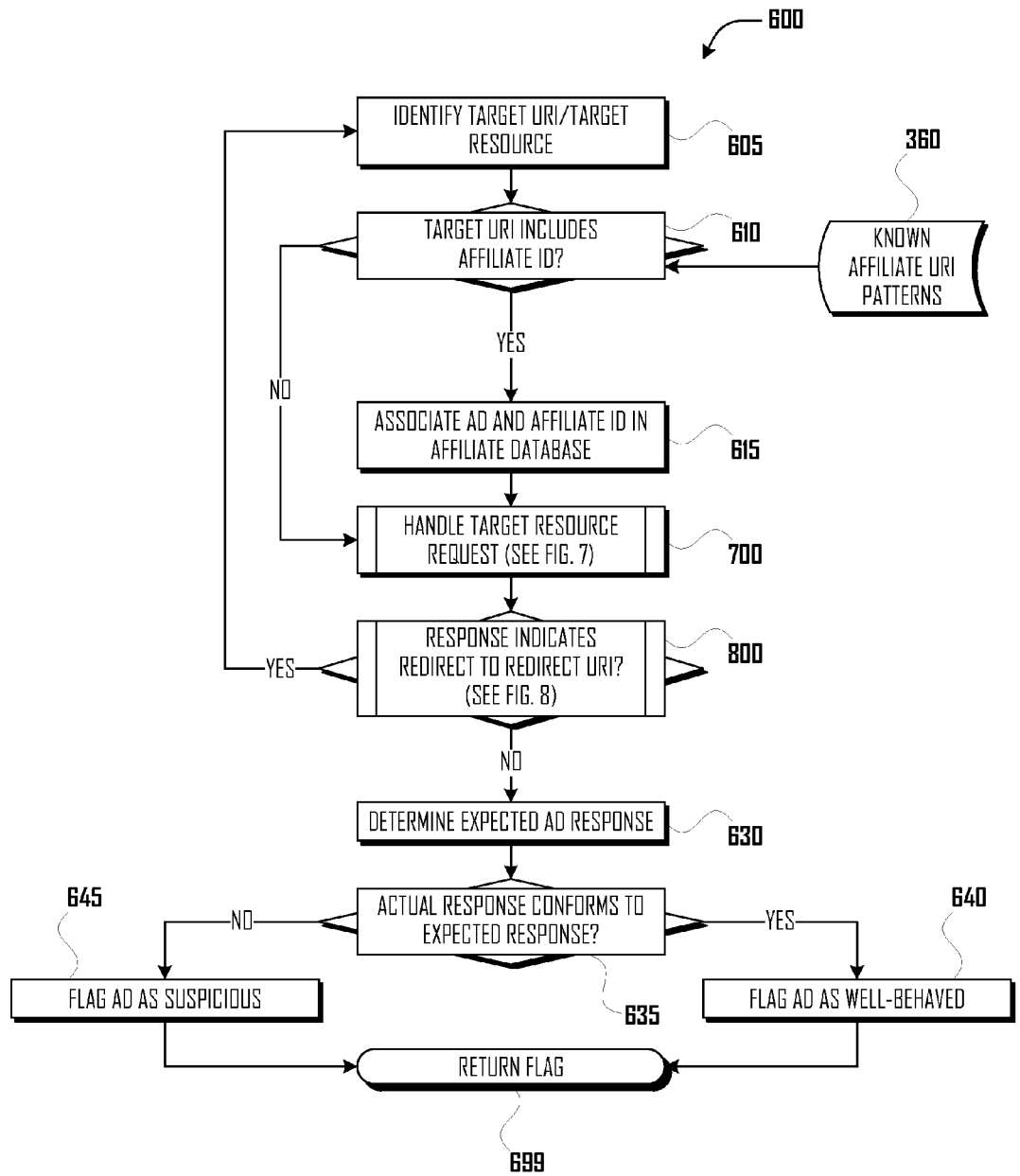
FIG. 6 illustrates an advertisement processing subroutine, in accordance with one embodiment.

FIG. 6 illustrates an advertisement processing subroutine 600, in accordance with one embodiment. In block 605, subroutine 600 identifies the advertisement's target URI, which refers to a target resource. In decision block 610, using one or more pre-determined known affiliate URI patterns 360 (see, e.g., Table 1, discussed above), subroutine 600 determines whether the target URI is an affiliate tracking URI that includes an affiliate ID. If so, then in block 615, subroutine 600 associates the affiliate ID with the advertisement in affiliate database 125.

In subroutine block 700 (see FIG. 7, discussed below), subroutine 600 handles a request for the target resource. In decision subroutine block 800 (see FIG. 8, discussed below), routine 600 determines whether the response to the request indicates a redirect to a redirect URI. If so, then subroutine 600 iterates back to block 605 to process the redirect URI.

Otherwise, if the response does not indicate a redirect, then in block 630, subroutine 600 determines an expected advertisement response. For example, in many embodiments, the expected advertisement response may include arriving at a landing page on the web site of the e-commerce merchant advertised by the advertisement, an affiliate tracking cookie having been dropped on the visitor's web browser prior to arriving at e-commerce merchant's web site.

In decision block 635, subroutine 600 determines whether the actual response received conforms to the expected response. If so, then in block 640, subroutine 600 flags the advertisement as well-behaved. Otherwise, in block 645, subroutine 600 flags the advertisement as suspicious, meaning that the advertisement's target URI behaves in a way that may suggest that a rogue affiliate is employing deceptive techniques to hide its affiliate ID from an affiliate investigator. For example, if the advertisement is for Amazon.com, but the advertisement's target URI ultimately leads to a destination other than at Amazon.com's website, the advertisement may be flagged as suspicious. Similarly, the advertisement may be flagged as suspicious if, for example, the advertisement is for Amazon.com, and the advertisement's target URI ultimately leads to a destination page at Amazon.com's website, but the redirect chain did not include an affiliate tracking URI and/or no affiliate tracking cookie was dropped prior to arriving at the ultimate destination page.

Having flagged the advertisement as suspicious or well-behaved, subroutine 600 ends in block 699 returning the flag set in block 640 or 645.

Figure 7:
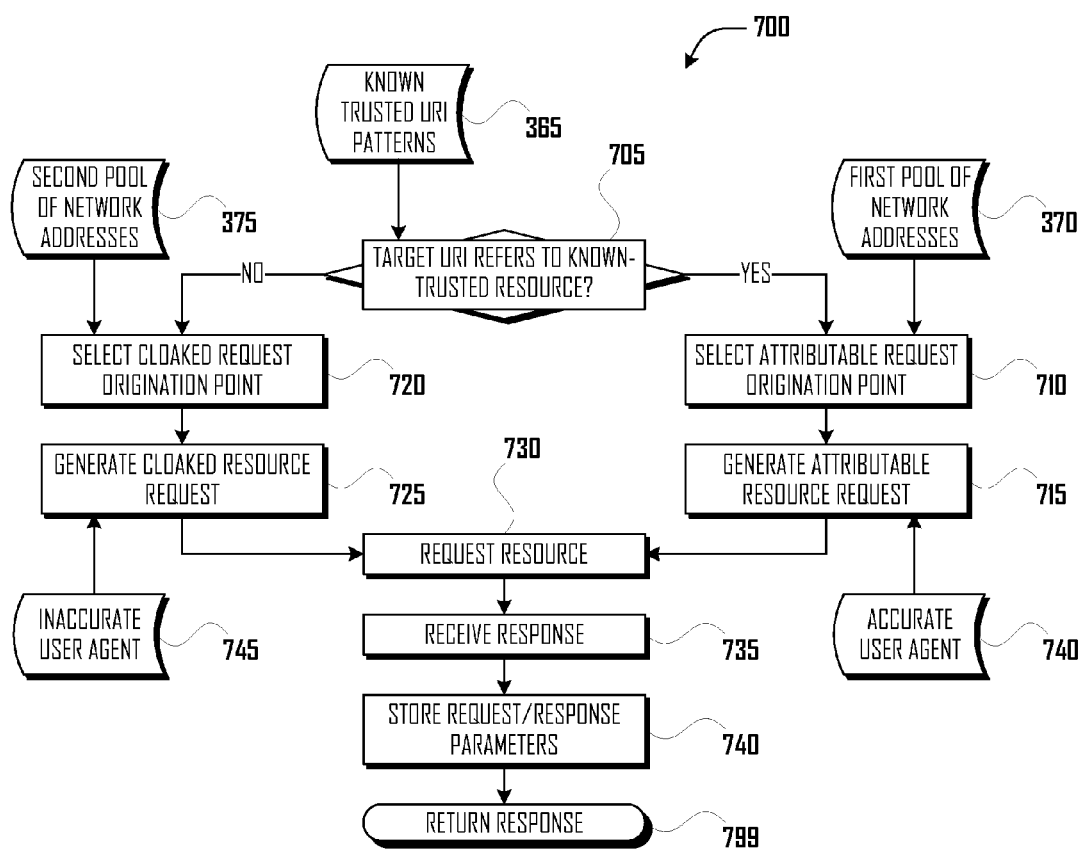
FIG. 7 illustrates a subroutine for handling a request for a target resource, in accordance with one embodiment.

FIG. 7 illustrates a subroutine 700 for handling a request for a target resource, in accordance with one embodiment. In decision block 705, using known trusted URI patterns 365, subroutine 700 determines whether the target URI refers to a resource that is known to be trusted. For example, in some embodiments, subroutine 700 may regard as trusted resources such as those provided by affiliate networks, advertising management services, advertisement tracking services, e-commerce merchants, and other known entities that are typically found in well-behaved affiliate advertising redirect chains.

In one embodiment, determining whether the target URI refers to a resource that is known to be trusted may involve matching the target URI against a list of known trusted URI patterns 365 such as the illustrative Python-syntax regular expressions shown in Table 3 (which represent several known advertising tracking services).

TABLE 3

^https?://[\d\w]*\.xg4ken\.com[/ \?$]
^https?://m\d+\.ic-live\.com[/ \?$]
^https?://[\d\w-]*\.(?:cpcmanager|gbppc)\.com[/ \?$]
^https?://[\d\w]*\.everesttech\.net[/ \?$]
^https?://[\d\w]*\.atdmt(?:uk|)\.com[/ \?$]'
^https?://clickserve\.(?:uk\.|us2?\.|)dartsearch\.net[/ \?$]
^https?://(?!gan)[\w\d-]*\.?[\w\d]*\.doubleclick\.net[/ \?$]

The Python-syntax regular expressions listed in Table 3 are merely illustrative of one pattern-matching technique that may be employed in some embodiments. In other embodiments, trusted URI patterns may be matched according to different regular expression syntaxes or even according to non-regular-expression pattern matching methods, including globbing, wildcard matching, and the like.

If the target URI is determined to refer to a resource that is known to be trusted, then subroutine 700 selects a request method suitable for requesting trusted resources. If not, then subroutine 700 employs a request method suitable for requesting resources that are not known to be trusted.

In general, trusted-resource request methods may be designed to provide accurate information about the resource requestor, while non-trusted-resource request methods may be designed to thwart affiliate ID hiding techniques employed by rogue affiliates. For example, a trusted-resource request method may include setting an accurate User-Agent HTTP header value (e.g., "BrandVerity Bot") as part of a request and/or originating the request from a network address (e.g., an IP address) that is accurately attributable to the affiliate-investigating entity and/or to a geographic location associated with the affiliate-investigating entity. Conversely, a non-trusted-resource request method may include setting an inaccurate User-Agent HTTP header value (e.g., "Mozilla/4.0") as part of a request and/or originating the request from a network address (e.g., an IP address) that is not attributable to the affiliate-investigating entity and/or to a geographic location associated with the affiliate-investigating entity.

Figure 9:
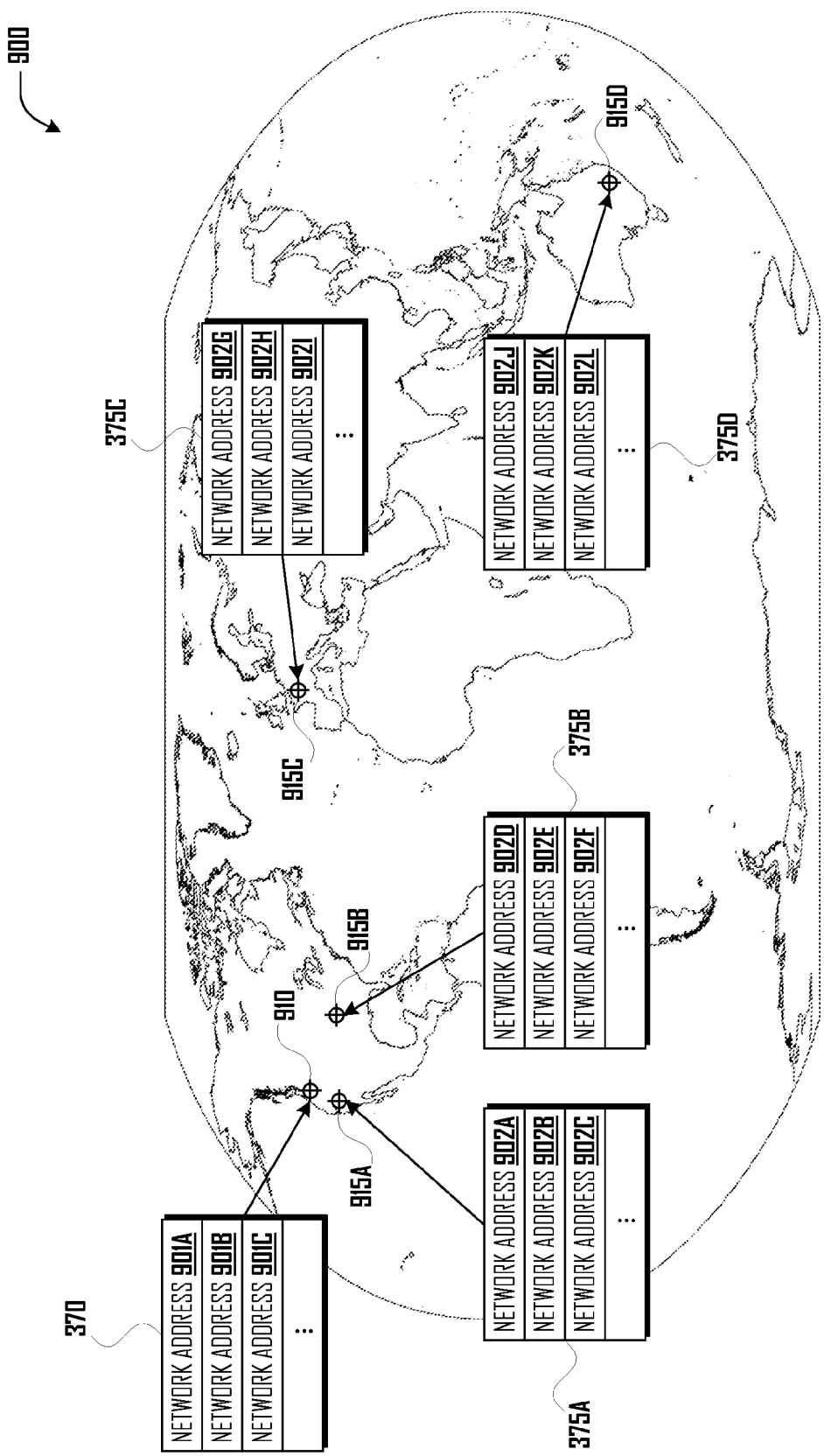
FIG. 9 illustrates geographically dispersed pools of network addresses, in accordance with one embodiment.

More specifically, if in decision block 705, subroutine 700 determines to select a trusted-resource request method, then in block 710, subroutine 700 selects an origination point for the request from a first pool of network addresses 370, addresses in the first pool being attributable to the affiliate investigating entity and/or to a geographic location associated with the affiliate investigating entity. For example, as illustrated in FIG. 9, geographic location 910 may be associated with the affiliate investigating entity, and network addresses 901A-C may be part of the first pool 370 of network addresses, which are also publicly attributable to geographic location 910.

In some embodiments, addresses in the first pool may be assigned to a computer that is physically located in the same geographic location as the affiliate investigating entity. In many cases, such computer may be the same device that is performing routine 500 (from which subroutine 700 is indirectly called).

Referring again to FIG. 7 and continuing the trusted-resource request method, in block 715, subroutine 700 generates a resource request that accurately identifies the requesting origin as a web-robot associated with the affiliate investigating entity. For example, in one embodiment, the generated request may be an HTTP request that includes accurate User-Agent 740 (e.g., "BrandVerity Bot") as an HTTP header value.

On the other hand, if in decision block 705, subroutine 700 determines to select a non-trusted-resource request method, then in block 720, subroutine 700 selects an origination point for the request from a second pool of network addresses 375, addresses in the second pool not being publicly attributable to the affiliate investigating entity and/or to a geographic location associated with the affiliate investigating entity. For example, as illustrated in FIG. 9, geographic locations 915A-D may not be associated with the affiliate investigating entity, and network addresses 907A-7 may be part of the second pool (including sub-pools 375A-D) of network addresses, network addresses 907A-7 being also publicly attributable to geographic locations 915A, 915B, 915C, or 915D (but not geographic location 910), as shown.

In some embodiments, addresses in the second pool may be assigned to computers that are physically located in different geographic locations than the affiliate investigating entity. In many cases, such computers may not be the same device that is performing routine 500 (from which subroutine 700 is indirectly called). Rather, subroutine 700 (and possibly portions of subroutine 600) may be executed in a distributed and/or asynchronous fashion across two or more devices, such as via remote command invocations, a proxy server, or the like.

If the advertisement being processed was originally obtained via a geographically-targeted search, then in some embodiments, that geographic target region may be identified, and the cloaked origination point may be selected to originate from a similar geographic location as that targeted by the search.

Referring again to FIG. 7 and continuing the non-trusted-resource request method, in block 725, subroutine 700 generates a resource request that inaccurately identifies the requesting origin as a non-robot that is not associated with the affiliate investigating entity. For example, in one embodiment, the generated request may be an HTTP request that includes as an HTTP header inaccurate User-Agent 745 (e.g., "Mozilla/4.0" or other agent string that suggests that the request is from an ordinary user, rather than from the affiliate investigating entity). In some embodiments, the cloaked request may also include a spoofed HTTP referrer header such that the request appears to have been generated as a result of an ordinary user following the advertisement's target URI.

In block 730, subroutine 700 requests the target resource according to the request generated in block 715 or block 725. In block 735, subroutine 700 receives a response to the request.

In block 740, subroutine 700 stores in affiliate database 225 one or more parameters associated with the request and/or the response. For example, in one embodiment, subroutine 700 may store a referrer URI from which the target resource was requested, a date and time at which the resource was requested, the origination point from which the request was made (including an apparent geographic origin of the request), and the like. In some embodiments, such parameters may be used if the current target URI is reprocessed at a later time, as varying times of day and/or geographic locations may be selected for subsequent re-processings. In block 799, subroutine 700 ends, returning the response to the caller.

Generally, requesting the target resource (block 730) involves sending the generated request from the origination point selected in block 710 or 720. In some cases (e.g., when a cloaked origination point is selected), requesting the resource may include instructing a remote device to request the resource on behalf of subroutine 700. In such cases, receiving the response may include the remote device communicate the response back to subroutine 700.

Figure 8:
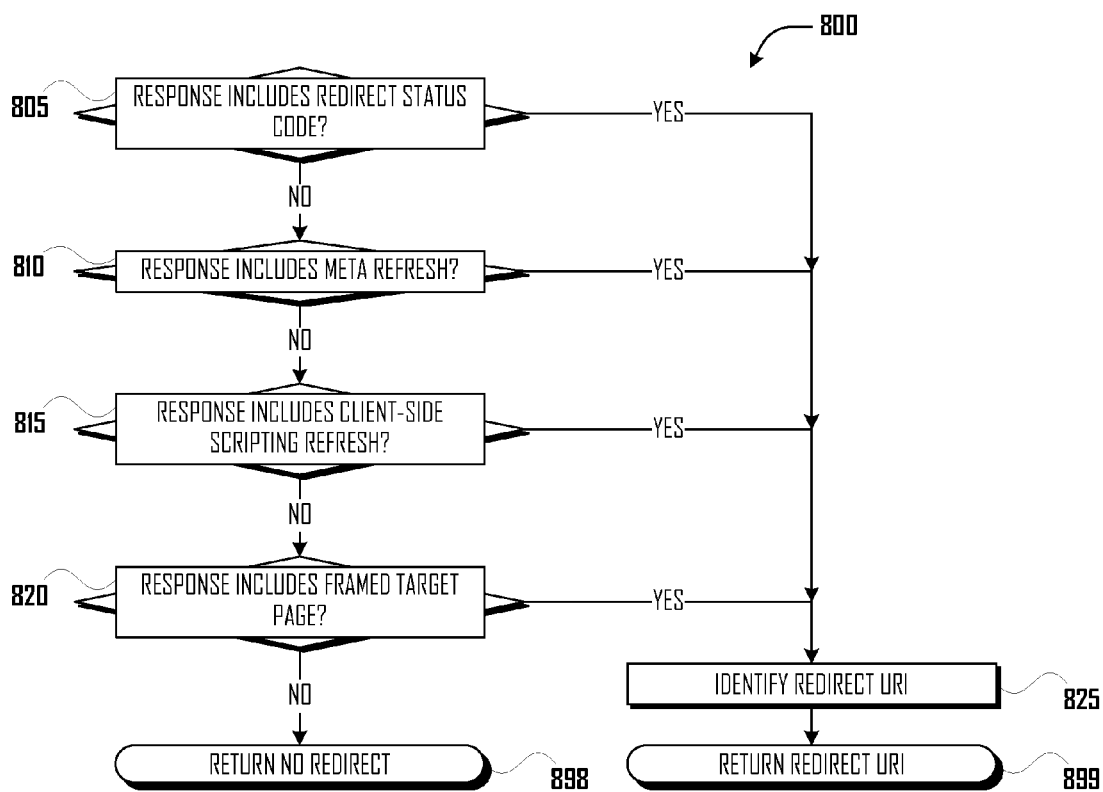
FIG. 8 illustrates a decision subroutine for determining whether a response indicates a redirect to a redirect URI, in accordance with one embodiment.

FIG. 8 illustrates a decision subroutine 800 for determining whether a response indicates a redirect to a redirect URI, in accordance with one embodiment. In decision block 805, subroutine 800 determines whether the response includes an HTTP response status code that indicates some sort of redirect. If so, then in block 825, subroutine 800 identifies the redirect URI and returns it in ending block 899.

For example, in general "3xx" HTTP response status codes, used in connection with the Location header, indicate that the requesting user agent must take additional action in order to fulfill the request. More specifically, HTTP response status code 302 (Found) is the most common way of performing a redirection. Additionally, the HTTP response status code 301 (Moved Permanently) is frequently used for permanent redirection. In some cases, the other "3xx" HTTP response status codes (e.g., 303 See Other, 307 Temporary Redirect, and the like) may also be used to indicate redirection.

Generally, HTTP "3xx" redirects either retain the original HTTP referrer or use a blank referrer (rather than a misleading referrer). In some embodiments, HTTP "3xx" redirects may therefore generally be considered well-behaved redirects.

Otherwise, if the response does not include a redirect status code, then in decision block 810, subroutine 800 determines whether the response includes a meta refresh. If so, then in block 825, subroutine 800 identifies the redirect URI and returns it in ending block 899.

Meta refresh is a method of instructing a web browser to automatically refresh the current web page or frame after a given time interval, using an HTML meta element with the http-equiv parameter set to "refresh" and a content parameter giving the time interval in seconds. It is possible to instruct the browser to fetch a different URL when the page is refreshed, by including the alternative URL in the content parameter. By setting the refresh time interval to zero (or a very low value), the meta refresh may be used as a method of URL redirection.

Meta refresh redirects are frequently used by rogue affiliates to launder referrers, and some embodiments may consider meta refresh redirects to be suspicious.

Otherwise, if the response does not indicate a meta refresh, then in decision block 815, subroutine 800 determines whether the response includes a client-side scripting refresh. If so, then in block 825, subroutine 800 identifies the redirect URI and returns it in ending block 899.

For example, many web browsers implement JavaScript (also known as ECMAScript) for client-side scripting. JavaScript offers several methods to display a different page in the current browser window. Quite frequently, such methods are used for redirects and to launder referrers by rogue affiliates. Consequently, some embodiments may consider client-side scripting redirects to be suspicious. In other embodiments, client-side scripting redirects may be detected when implemented in client-side scripting languages other than JavaScript, such as Adobe Flash (provided by Adobe Systems, Inc., of San Jose, Calif.), Microsoft Silverlight (provided by Microsoft Corporation of Redmond, Wash.), and the like.

In order to determine whether the response includes a client-side scripting refresh, some embodiments of subroutine 800 may implement JavaScript (or other client-side scripting language) interpreter. Web robots generally do not include such client-side scripting interpreters.

Otherwise, if the response does not include a client-side scripting refresh, then in decision block 820, subroutine 800 determines whether the response includes a framed target page. If so, then in block 825, subroutine 800 identifies the redirect URI, and returns it in ending block 899.

For example, an apparent redirect can be achieved by including in the response an HTML frame that contains a redirect page. Quite frequently, framed redirects are used to launder referrers by rogue affiliates. Consequently, some embodiments may consider framed redirects to be suspicious.

Otherwise, if no redirects were detected, in ending block 898, subroutine 800 returns indicating no redirect. Subroutine 800 includes a representative set of redirection-detecting techniques that may be employed in one embodiment.

Other embodiments may use more, fewer, and/or differed redirection-detecting techniques. For example, a response may include an alternate request that has the effect of dropping an affiliate cookie. In one embodiment, the affiliate may make an image request, in which the resource requested is actually an affiliate link that leaves a cookie when called. This technique may be extended to other tags and requests.

Figure 10:
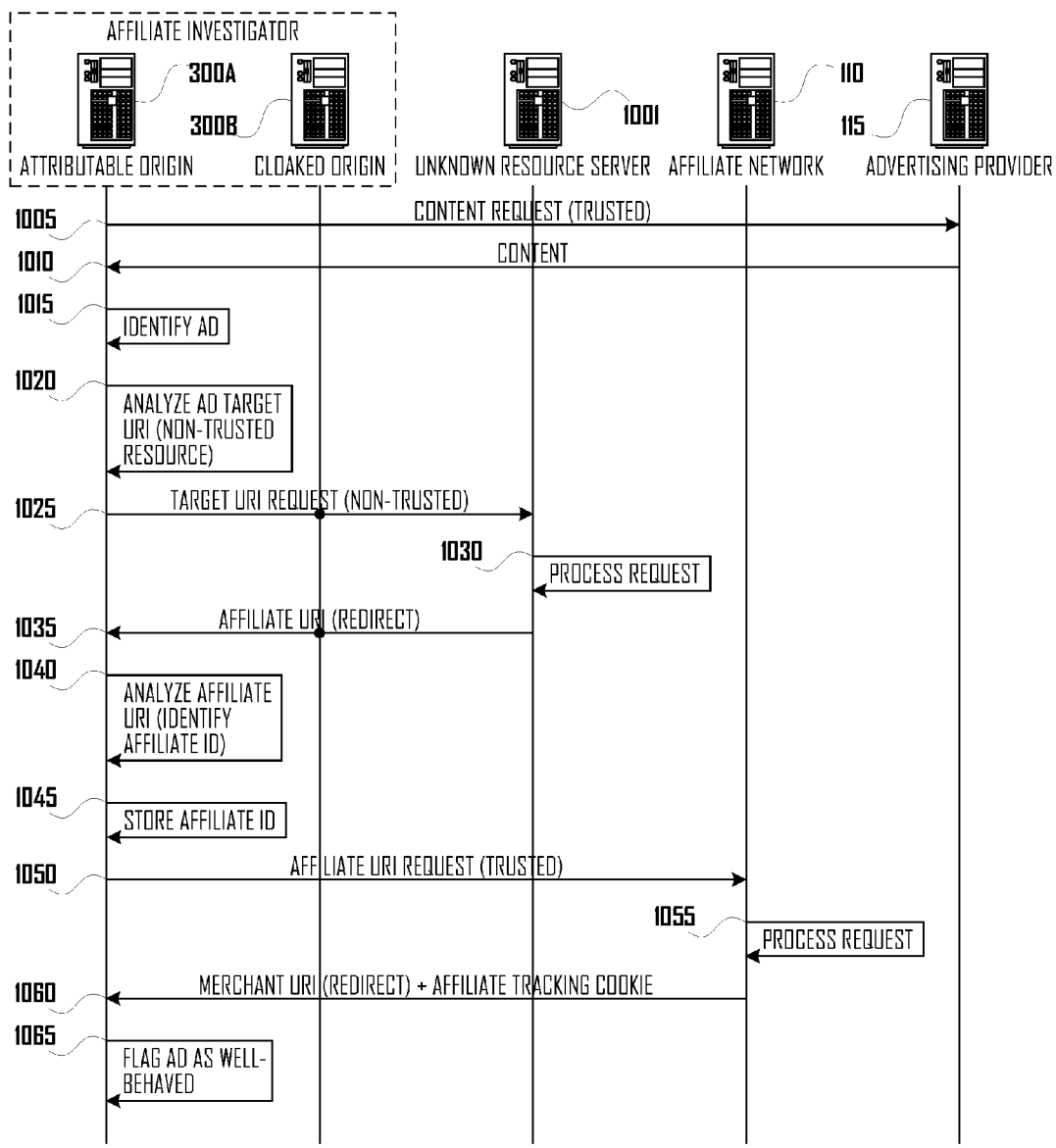
FIG. 10 is a data flow diagram illustrating an exemplary scenario in which an affiliate investigator investigates an advertisement placed by a well-behaved affiliate, in accordance with one embodiment.

FIG. 10 is a data flow diagram illustrating an exemplary scenario in which an affiliate investigator investigates an advertisement placed by a well-behaved affiliate, in accordance with one embodiment. Affiliate investigator sends content request 1005 via a trusted-resource request method to advertising provider 115 from attributable origin 300A (e.g., an origin whose network address is selected from a first pool of network addresses that are publicly associated with the affiliate investigator and/or a geographic location associated with the affiliate investigator).

Advertising provider 115 sends the requested content 1010 back to attributable origin 300A. In various embodiments, content 1010 may include a search results page; a web page from a review site, a coupon site, a blog, or other web site on which advertisements appear; a tweet or other micro-blog entry; a promotional email, text message, or other advertisement-containing content.

Affiliate investigator identifies an advertisement 1015 in the content, the advertisement including a URI that refers to a target resource. Affiliate investigator analyzes the advertisement's target URI to determine whether it is known to be a trusted resource. (See, e.g., block 705, discussed above.) In the illustrated scenario, the target URI is determined to not refer to a trusted resource. Therefore, affiliate investigator sends a request 1025 for the target URI via a non-trusted-resource request method, the request being routed to unknown resource server 1001 through cloaked origin 300B (an origin whose network address is selected from a second pool of network addresses that are not publicly associated with the affiliate investigator and/or a geographic location associated with the affiliate investigator). Request 1025 may also include an inaccurate user agent identifier.

Unknown resource server 1001 processes the request 1030, and returns a response 1035 that indicates a redirect to an affiliate tracking URI. Affiliate investigator analyzes 1040 the affiliate URI and identifies an affiliate ID. Affiliate investigator stores the affiliate ID 1045 in affiliate database 125 in association with the identified advertisement. Affiliate investigator then generates and sends a trusted-request-method request 1050 for the resource referred to by the affiliate tracking URI to affiliate network 110.

Affiliate network 110 processes the request 1055, and responds with an affiliate tracking cookie and a redirect to a merchant URI 1060. Determining this to be expected behavior, affiliate investigator flags the advertisement as well-behaved 1065.

Figure 11:
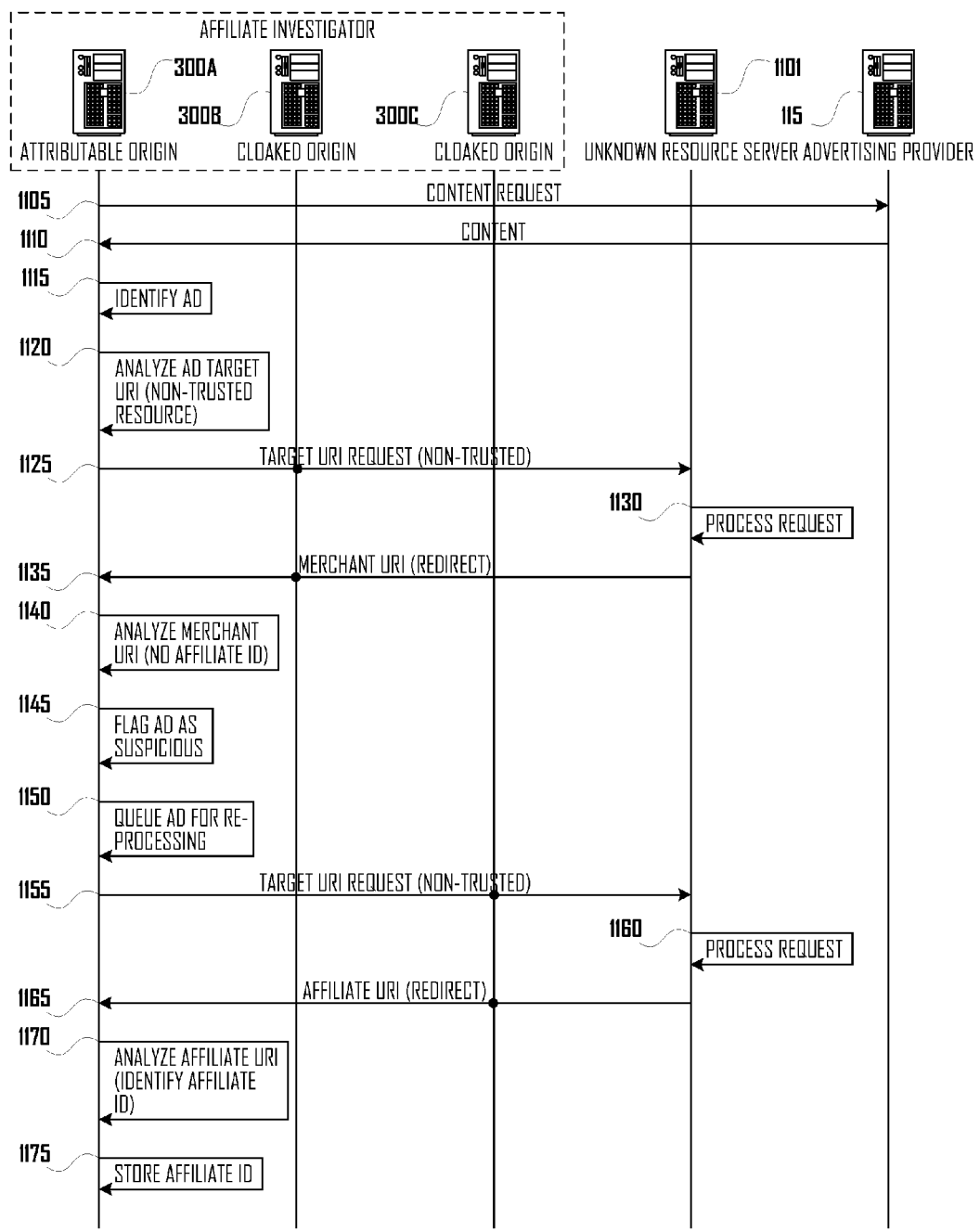
FIG. 11 is a data flow diagram illustrating an exemplary scenario in which an affiliate investigator investigates an advertisement placed by a rogue affiliate, in accordance with one embodiment.

FIG. 11 illustrates an exemplary scenario in which affiliate investigator investigates a non-well-behaved advertisement, placed by a rogue affiliate, in accordance with one embodiment. Affiliate investigator sends content request 1105 via a trusted-resource request method to advertising provider 115 from attributable origin 300A (e.g., an origin whose network address is selected from a first pool of network addresses that are publicly associated with the affiliate investigator and/or a geographic location associated with the affiliate investigator).

Advertising provider 115 responds sending content 1110 back to attributable origin 300A. In various embodiments, content 1010 may include a search results page; a web page from a review site, a coupon site, a blog, or other web site on which advertisements appear; a tweet or other micro-blog entry; a promotional email, text message, or other advertisement-containing content.

Affiliate investigator identifies an advertisement 1115 in the content, the advertisement including a URI that refers to a target resource. Affiliate investigator analyzes the target URI included in the advertisement to determine whether the resource referred to by the target URI is known to be trusted. In the illustrated scenario, the target resource is not known to be a trusted resource. Therefore, affiliate investigator sends request 1125 via a non-trusted-resource request method, the request being routed to unknown resource server 1101 through cloaked origin 300B (an origin whose network address is selected from a second pool of network addresses that are not publicly associated with the affiliate investigator and/or a geographic location associated with the affiliate investigator). Request 1125 may also include an inaccurate user agent identifier.

Unknown resource server 1101 processes the request 1130, and sends a response 1135 that indicates a redirect directly to an e-commerce merchant URI. Affiliate investigator analyzes the merchant URI, and in the exemplary scenario, does not identify an affiliate ID. Determining this to be unexpected behavior, affiliate investigator flags 1145 the advertisement as being suspicious, and affiliate investigator queues 1150 the advertisement for reprocessing. In some embodiments, when it leaves the queue, the advertisement may be reprocessed at a different time of day and/or from a different apparent origin. Accordingly, affiliate investigator sends a second request for the target URI 1155, this time from cloaked origin 300C to unknown resource server 1101. Cloaked origin 300C may be assigned a network address that is attributable to a different geographic location than cloaked origin 300B.

Unknown resource server 1101 processes the request 1160, but on this occasion, unknown resource server 1101 replies with a redirect 1165 to an affiliate tracking URI. Affiliate investigator analyzes the affiliate URI 1170 and identifies an affiliate ID. Affiliate investigator stores affiliate ID 1175 in affiliate database 125 and associates it with the advertisement.

Once an affiliate ID has been discovered by some means, it may be desirable to determine whether that affiliate ID belongs to an affiliate that participates in a given merchant's affiliate program. However, many affiliate networks may not provide a ready method for making such a determination.

Figure 12:
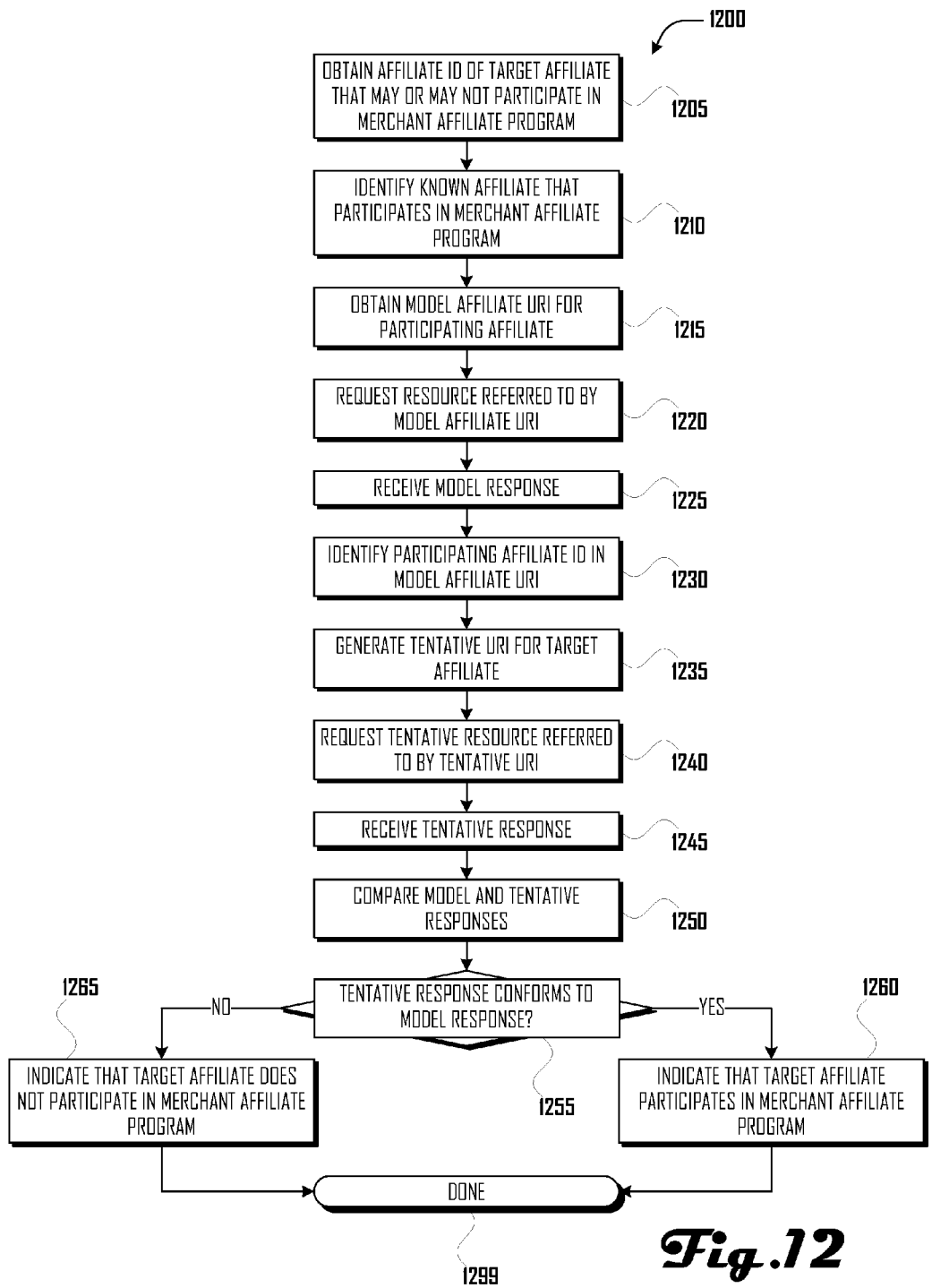
FIG. 12 illustrates a routine for determining whether a given affiliate ID is associated with an affiliate who participates in a given merchant's affiliate program, in accordance with one embodiment.

FIG. 12 illustrates a routine 1200 for determining whether a given affiliate ID is associated with an affiliate who participates in a given merchant's affiliate program, in accordance with one embodiment.

In block 1205, routine 1200 obtains an affiliate ID of a target affiliate that may or may not participate in a given merchant's affiliate program. For example, in one embodiment, routine 1200 may obtain an affiliate ID such as "aff123". In block 1210, routine 1200 identifies an affiliate that is known to participate in the given merchant's affiliate program (e.g., by querying affiliate database 225). For example, in one embodiment, routine 1200 may identify an affiliate with an affiliate ID of "affabc".

In block 1215, routine 1200 obtains a model affiliate URI for the participating affiliate. For example, in one embodiment, routine 1200 obtains a model affiliate URI such as "http://affabc.phonesrch.hop.clickbank.net/".

In block 1220, routine 1200 requests the resource referred to by the model affiliate URI (typically via a trusted-resource request method). In block 1225, routine 1200 receives a response to the request sent in block 1220. For example, in one embodiment, the response may include a redirect to a particular page on a merchant website, and the response may include an affiliate tracking cookie.

In block 1230, routine 1200 identifies the participating affiliate's affiliate ID within the model affiliate URI. For example, using a list of known affiliate URI patterns 360 (see Table 1, discussed above), routine 1200 may identify the affiliate ID "affabc" for the participating affiliate.

In block 1235, routine 1200 generates a tentative URI for the target affiliate according to the model URI obtained in block 1215. For example, in one embodiment, routine 1200 may perform a substitution operation on the model affiliate URI to obtain a tentative URI, such as "http://aff123.phonesrch.hop.clickbank.net/".

In block 1240, routine 1200 requests the resource (which may or may not exist) referred to by the tentative URI (typically via a trusted-resource request method). In block 1245, routine 1200 receives a response to the request sent in block 1240. In block 1250, routine 1200 compares the model response received in block 1225 with the tentative response received in block 1245.

In decision block 1255, routine 1200 determines whether the tentative response conforms to the model response. If so (e.g., if the tentative response includes a redirect to a similar merchant page as the model response, and if the tentative response includes a similar affiliate tracking cookie), then in block 1260, routine 1200 indicates that the target affiliate does participate in the merchant affiliate program.

Otherwise, if the tentative response does not conform to the model response (e.g., if the tentative response includes a redirect to a different web page than the model response, and/or if the tentative response does not includes a similar affiliate tracking cookie, and/or if the tentative response includes an error status code), then in block 1265, routine 1200 indicates that the target affiliate does not participate in the merchant's affiliate program. Routine 1200 ends in block 1299.

In various embodiments, routine 1200 may be performed iteratively for a given target affiliate, with different known affiliates and model URIs used in different iterations to determine whether a given affiliate ID is associated with an affiliate who participates in a given merchant's affiliate program.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

We claim:

1. A computer-implemented method of determining whether a given affiliate ID represents an affiliate that participates in a merchant's affiliate program, the method comprising:

obtaining, by the computer, a known affiliate ID corresponding to a known affiliate that participates in the merchant's affiliate program;

obtaining, by the computer, a model Uniform Resource Identifier (URI) referring to a known resource associated with the merchant and said known affiliate ID;

requesting, by the computer, said known resource using said model URI;

receiving, by the computer, a model response corresponding to the model URI;

generating, by the computer using said model URI, a tentative URI referring to a tentative resource that, if it exists, would be associated with the merchant and the given affiliate ID;

requesting, by the computer, said tentative resource using said tentative URI;

receiving, by the computer, a second response corresponding to the tentative URI;

determining, by the computer, a comparison between said second response and said model response; and determining, by the computer, whether the given affiliate ID represents an affiliate that participates in the merchant's affiliate program according to said comparison.

2. The method of claim 1, wherein determining said comparison comprises determining whether one or both of said second response and said model response comprises an affiliate-tracking cookie.

3. The method of claim 1, wherein determining said comparison comprises determining whether said second response comprises an error response.

4. A computer-readable, non-transitory storage medium having stored thereon instructions that, when executed by a processor, configure the processor to:
   obtain a known affiliate ID corresponding to a known affiliate that participates in the merchant's affiliate program;
   obtain a model Uniform Resource Identifier (URI) referring to a known resource associated with the merchant and said known affiliate ID;
   request said known resource using said model URI;
   receive a model response corresponding to the model URI;
   generate, using said model URI, a tentative URI referring to an tentative resource that, if it exists, would be associated with the merchant and the given affiliate ID;
   request said tentative resource using said tentative URI;
   receive a second response corresponding to the tentative URI;
   determine a comparison between said second response and said model response; and
   determine whether the given affiliate ID represents an affiliate that participates in the merchant's affiliate program according to said comparison.

5. The non-transitory storage medium of claim 4, wherein the instructions that configure the processor to determine said comparison further comprise instructions configuring the processor to determine whether one or both of said second response and said model response comprises an affiliate-tracking cookie.

6. The non-transitory storage medium of claim 4, wherein the instructions that configure the processor to determine said comparison further comprise instructions configuring the processor to determine whether said second response comprises an error response.

7. A computing apparatus for determining whether a given affiliate ID represents an affiliate that participates in a merchant's affiliate program, the apparatus comprising a processor and a memory storing instructions that, when executed by the processor, configure the apparatus to:
   obtain a known affiliate ID corresponding to a known affiliate that participates in the merchant's affiliate program;
   obtain a model Uniform Resource Identifier (URI) referring to a known resource associated with the merchant and said known affiliate ID;
   request said known resource using said model URI;
   receive a model response corresponding to the model URI;
   generate, using said model URI, an tentative URI referring to an tentative resource that, if it exists, would be associated with the merchant and the given affiliate ID;
   request said tentative resource using said tentative URI;
   receive a second response corresponding to the tentative URI;
   determine a comparison between said second response and said model response; and
   determine whether the given affiliate ID represents an affiliate that participates in the merchant's affiliate program according to said comparison.

8. The apparatus of claim 7, wherein the instructions that configure the apparatus to determine said comparison further comprise instructions configuring the apparatus to determine whether one or both of said second response and said model response comprises an affiliate-tracking cookie.

9. The apparatus of claim 7, wherein the instructions that configure the apparatus to determine said comparison further comprise instructions configuring the apparatus to determine whether said second response comprises an error response.

* * * * *